United States Patent [19]

Le Roux

[11] Patent Number: 5,486,687

[45] Date of Patent: *Jan. 23, 1996

[54] MEMORY CARD HAVING A RECESSED PORTION WITH CONTACTS CONNECTED TO AN ACCESS CARD

[75] Inventor: Jean-Yves Le Roux, Bouc Bel Air, France

[73] Assignee: Gemplus Card International, Gemenos, France

[*] Notice: The term of this patent shall not extend beyond the expiration date of Pat. No. 5,375,037.

[21] Appl. No.: 312,647

[22] Filed: Sep. 27, 1994

Related U.S. Application Data

[63] Continuation of Ser. No. 997,501, Dec. 28, 1992, Pat. No. 5,375,037.

[30] Foreign Application Priority Data

Jan. 14, 1992 [FR] France ................... 92 00323

[51] Int. Cl.⁶ ............. G06K 19/06; G06K 5/00
[52] U.S. Cl. ........................... 235/382; 235/492
[58] Field of Search ............... 235/441, 492, 235/444, 382, 380, 375, 379; 439/76, 74, 59, 638; 361/684, 737, 783, 820, 728–730, 821; 273/148 B, 435

[56] References Cited

U.S. PATENT DOCUMENTS 5,043,562  8/1991  Hautvast et al. ............... 235/486 X
5,375,037  12/1994  Le Roux ....................... 235/492 X Primary Examiner—Donald T. Hajec
Assistant Examiner—Thien Minh Le
Attorney, Agent, or Firm—Roland Plottel

[57] ABSTRACT

The invention relates to exchangeable memory cards having several integrated circuits for personal computers. These memory cards serve as a large capacity mass memory for replacing floppy disks and other exchangeable magnetic supports. In particular, they have a plug-in connector (12) at the end of the card and can be inserted in the reader in accordance with PCMCIA standards of a microcomputer. According to an aspect of the invention, a flush contact chip card memory is formed by such a plug-in card (10) and for this purpose the latter has a supplementary connector with flush contacts on its principal face (14). The thus formed reader is transportable, with its application software stored in the card (10) and can be installed in any random microcomputer equipped with a PCMCIA reader. A credit card or security card (18) can then be inserted in the transportable reader. The memory card is typical a PCMCIA size card with a recess on one major plane surface and the security cards fits into this recess.

7 Claims, 2 Drawing Sheets

MEMORY CARD HAVING A RECESSED PORTION WITH CONTACTS CONNECTED TO AN ACCESS CARD

This application is a continuation of application Ser. No. 07/997,501, filed Dec. 28, 1994, now U.S. Pat. No. 5,375,037.

FIELD OF THE INVENTION

The invention relates to exchangeable memory cards to be temporarily inserted in a card reader forming part of a microcomputer or personal computer (PC). These cards are mainly mass memory cards for portable computers. In the future, they could replace floppy disks and other magnetic mass storage means. They can be used as a mass memory having as large a capacity as magnetic floppy disks (approximately 1 million bytes). Their size is no greater than the floppy disk (credit card size, thickness 3 to 5 mm) and they offer much faster access (several thousand times faster).

PRIOR ART

Mass memory cards, sometimes known as PC-cards have several memory chips and a connector (68 pin female connector according to the PCMCIA standard of the Personal Computer Memory Card International Association, 1030B East Duane Avenue, Sunnyvale, Calif. The card can be plugged into a corresponding male connector of the computer. The connections are such that the memory can be addressed by a parallel input-output port of the PC, either as if the memory was a magnetic mass memory, or as if it was an extension of the RAM of the computer.

OBJECTS AND ADVANTAGES

According to the invention, it is considered that it would be of particular interest to use this type of card as a main member forming a card reader with a flat chip and flush contacts (cards such as those mainly used for access security to rooms, for banking transactions, for the provision of services such as telephone communications, etc.).

The invention therefore proposes a plug-in or pluggable memory card for a microcomputer having several integrated circuit chips and a connector with several dozen plug-in contacts at the end of the card, characterized in that it also comprises a supplementary connector with several flush contacts on a principal surface of the card, said supplementary connector being able to come into contact with a chip card of the credit card type, i.e. a flat card, whose access contact as flush on a principal face.

For simplification purposes hereinafter, the term "memory card" will be used for the card having plug-in contacts at the end and "credit card" for the card with flush contacts, even though the general functions of these cards do not correspond to memories or to credit systems.

The arrangement is such that the mass memory card and the credit card can be inserted face to face and at the same time into a mass memory card reader. Insertion brings about the application of the mass memory card supplementary connector to the access contacts of the credit card. Or alternatively the mass memory card is already plugged in place in a slot of a card reader of a microcomputer and it is possible to insert the credit card into the space left within the gap.

In this way, the mass memory card serves as a credit card reader whilst having a compact size and whilst in particular being portable or transportable, because the mass memory card is by definition an exchangeable card. This leads to a PC credit card reader, which can be carried from one PC to another and it is very advantageous because it can simply be plugged into the PCMCIA reader of a microcomputer. The credit card reader application software can be incorporated into the memory card, which can have a very large nonvolatile storage capacity.

The integrated circuit chips of the memory card will in particular be used for establishing a communication with the credit card and which may or may not be controlled by the microcomputer.

The simultaneous presence of two cards in the same reader assumes that the total thickness of the two cards is compatible with the height of the insertion slot of the reader. As this slot is approximately 5 mm and the security card has a thickness of less than 1 mm, the memory card will be given a thickness less than the width of the slot, in the area where the cards are face to face.

The supplementary connector of the card will preferably have a slight extra thickness compared with the face of the card on which it is located, so that it easily comes into contact with the contacts of the credit card, when the latter is applied to it in the reader. The cover will then naturally have a holding action.

According to another aspect of the invention, the latter can be used for rendering secure mass memory cards containing data which are to be protected during reading and/or writing.

In other words, the credit card will then be a security card used for controlling access to the mass memory, but instead of said security card communicating directly with the microcomputer, it will communicate with the mass memory card, whose security it is to ensure. In the absence of the security card, access to the mass memory (or at least certain parts of the latter, either during reading, or during writing) would be prevented and the user would not have access thereto from the microcomputer. In addition, the inhibiting action would be exercised by the electronic circuits of the mass memory card and not by the microcomputer, which offers a much greater security.

BRIEF DESCRIPTION OF THE DRAWINGS

The invention is described in greater detail hereinafter relative to non-limitative embodiments and with reference to the attached drawings, wherein show.

SUMMARY OF THE INVENTION

Figure 1:
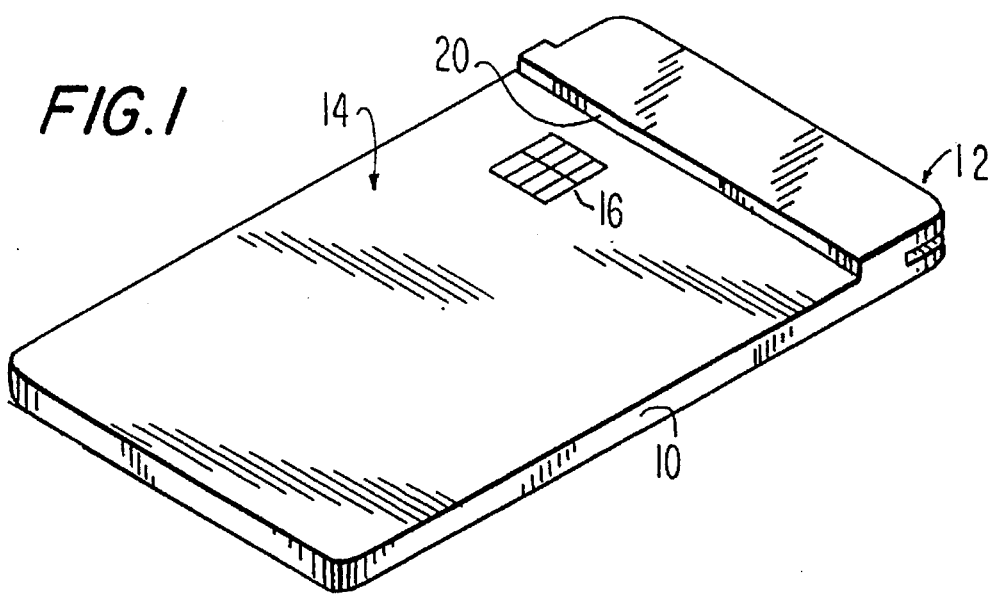
FIG. 1 A general perspective view of the plug-in card according to the invention forming a flush contact credit card reader.

FIG. 1 shows a mass memory card according to the invention. This memory card is generally understood to mean a card having several integrated circuit chips, as well as a connector having multiple pins at the end of the card. Typically, the PCMCIA standard defines such cards with 68 output contacts for card sizes of approximately 5 cm×8 cm and a thickness of approximately 3 to 5 mm. Thus, it is essentially a flat card having two parallel, principal faces.

The card is designated by the reference 10. The connector is at the end on a small side of the card and is designated by 12. In principle, it is a female connector. It can be plugged into a corresponding male connector of a card reader forming part of a microcomputer or connected to a microcomputer.

According to the invention, on one of the two principal faces of the card, e.g. the face 14 at the top in FIG. 1, is provided a supplementary connector 16, which has flush contacts. Thus, it is not a plug-in connector like the connector 12. In face, it is a connector constituted by several contacts all extending parallel to the plane of the upper surface 14 of the card and preferably projecting slightly with respect to said plane. More specifically, the connector is designed and positioned in such a way that it can come into contact with the different contacts of a chip card of the flush contact credit card type when such a card is placed against the principal face 14. Contact takes place by pressure when the cards are applied to one another.

Typically, according to existing standards, chips cards of the credit card type have a connector with eight flush planar contacts on a principal face of the card. For example, ISO standard 7816 defines the shapes and positions of these contacts. The credit card has dimensions very similar (approximately 5×8 cm side length) to those of the memory card and a limited thickness (approximately 1 mm).

Figure 2:
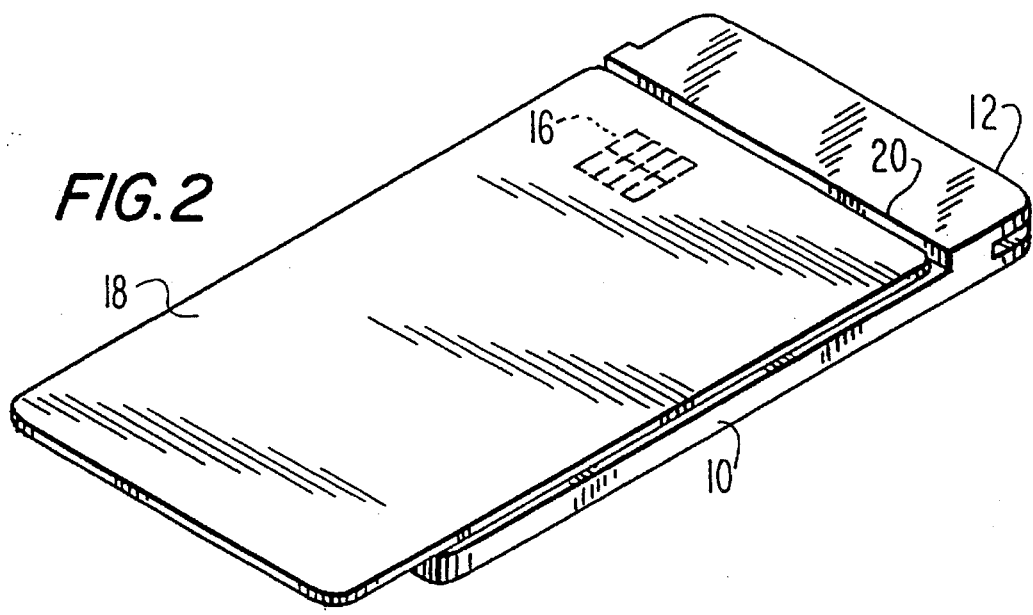
FIG. 2 A similar view of FIG. 1, but with the credit card in place on the plug-in memory card.

FIG. 2 is an identical view to FIG. 1, but in which a credit card 18 has in this way been put into place. Preferably the card 10 has the same width as the credit card 18, e.g. 5.4 cm. This width corresponds to the width of the insertion slot into which will be introduced the card 10 in the computer reader. The two cards could be inserted into said slot if they were correctly superimposed and in this position the access contacts of the credit card 18 are electrically connected to the connector 16 of the card 10.

Preferably, the end of the memory card 10 on the sides of the connector 12 is thicker than the remainder of the card. The credit card 18 can abut against an edge 20 separating the thicker part from the thinner part and which is parallel to a small edge of the cards. In addition, the summated thickness of the card 10 and the card 18 is substantially equal to the thickness of the thicker part of the card 10. In all cases, this cumulative thickness does not exceed the height of the slot in which the two cards will be inserted.

This gives a card 10 which, when inserted in a card reader, can constitute a flush contact credit card reader, with the special feature that it can be very easily transported for installation in any random microcomputer.

Figure 3:
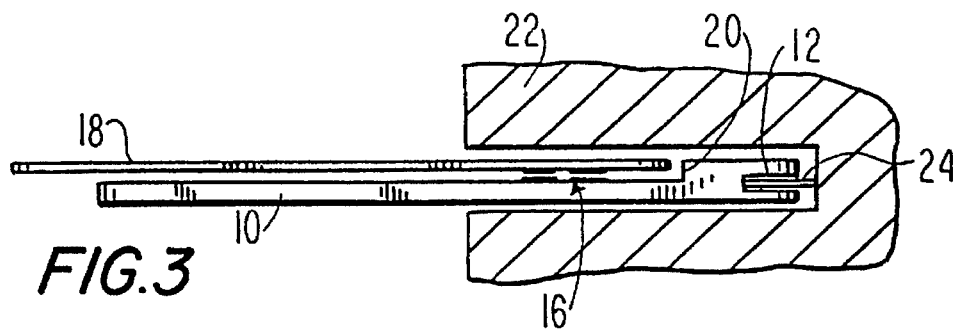
FIG. 3 A cross-section through the two cards located in a PC memory and reader.

FIG. 3 shows in section the two cards inserted in a mass memory card reader 22, which has a connector 24, into which can be plugged the connector 12. When the card 10 is in place in the reader, it serves as a card reader for a flush contact credit card-type card 18.

The drawings do not show possible constructional features, such as a mechanical, electrical or optical card detector on the card 10. Such a detector may be useful in the case where the operating programs of the memory card 10 permanently perform a waiting loop for the insertion of the card 18. Thus, the main operation of the card and even the microcomputer may not be authorized (with the exception of a few programs), for as long as a card 18 is not inserted.

This credit card reader structure is particularly interesting due to the considerable processing capacities of existing memory cards of the PCMCIA type. Thus, no matter whether as a result of the memory capacities (several hundred or thousand megabytes) or the actual processing capacities (microprocessors), the cards can have all the application software enabling them to then have all the functionalities of a credit card reader as soon as they are supplied with power. The microcomputer receiving them will ensure the interface with the user, by its keyboard and screen and can also control the system, whose operation is under the control of the credit card. The credit card can be a clearance or authorization card (security card) authorizing the use of the microcomputer. In the first aspect of the invention, the main function of the memory card 10 is to form a flush contact card reader, which is by its very nature exchangeable, in the same way as a magnetic floppy disk. In this case, the memories and other integrated circuit chips of the card are dedicated to this use, i.e. the card has e.g. a microprocessor, which controls the communication protocols with the connector 16 and memories containing operating programs of said microprocessor and interfacing programs with the computer by the connector 12.

In another aspect of the invention, with the given high processing and memory capacities of the PCMCIA cards, the circuitry used for transforming the card 10 into a flush contact card reader is only an auxiliary aspect of the operation of the memory card. The card has main functions which are to be accomplished under the control of the computer and the function of the credit card reader is one among many.

To complete this description, it will be demonstrated how the invention can in particular be used in the latter case for ensuring the protection of the content of the actual mass memory card.

According to an aspect of the invention, it is considered desirable to bring about maximum security of mass memory cards for personal computers. Thus, as a result of their considerable capacity they can contain either significant data bases which should be protected both in reading and writing, or expensive programs which should not be used or duplicated without authorization. Finally, they can used for carrying out confidential transactions in accordance with programs more sophisticated than those which exist at present, or implying larger data quantities than those which can be stored by secure transaction chip cards, which only have a single chip.

Thus, with the structure according to the invention, the mass memory card has security control programs, which prevent the use of the memory card if a flush contact security card is not present in the card reader at the same time as the memory card, and if the communication between the memory card, the security card and the microcomputer user reveals that the user is not the authorized holder of the security card corresponding to that expected by the memory card. The expression "security card" is here understood to mean a card able to verify an authorization or encode data in such a way as to make fraud impossible or virtually impossible. A card containing a confidential code and means for verifying the code introduced with the keyboard by the user is an example of a security card.

As a result of the invention, the following operating protocol is envisioned. A memory card is inserted in the microcomputer reader. This operation initiates a communication protocol enabling the microcomputer to partly communicate with the card. The insertion of a security card is requested on the screen. If a security card is not introduced, it will not be possible to carry out the normal use of the memory card. If a security card is introduced, a communication is established between the latter and the memory card, the latter controlling the situation. A pass word is requested on the screen and is introduced by the user with the keyboard. This pass word is received by the memory card, which transmits it directly, or better still in encoded form, to the security card. The latter carries out the necessary verification operations on the pass word. If the pass word is not correct, the signal returned by the security card is read by the memory card as a normal operation inhibition. It therefore blocks those parts of the circuits or memories which must remain protected. The normal operation authorization for the card is not given by the PC card. The card protects itself against an unauthorized use. If the pass word is correct, authorization is given. Authorization can be in a general form once the pass word has been given, or can be in a partial form as a function of the degree of authorization or clearance allowed by the pass word.

It is clear that a sophisticated protection can be obtained on the content of the card. It is possible to protect all or part of the card, both in reading and in writing. The card manufacturer can provide for correspondence between the memory card and an associated specific security card. In the latter case, the operation of the card may only be authorized if not only the user has a pass word, but also the security card is indeed the expected card. It is also possible to have a clearance if only one of these conditions is fulfilled.

It is clear that the memory card is protected without the security checking communication passing via the microcomputer, which is advantageous.

Thus, a particularly important example of the use of the invention has been given. Up to now it has not been possible to protect mass memory cards and only the microcomputers could be given an overall protection, without their various mass memory readers being individually protectable and in particular without the contents of said mass memories being protected as soon as they were inserted in an unprotected microcomputer.

The integrated circuit inserted in such a security card is preferably a single chip having a non-volatile memory with confidential informations, which cannot be transmitted on the external terminals of the integrated circuit and a programmed security circuitry. This circuitry can use confidential informations and other informations supplied by the user, in order to provide validation instructions after checking a predetermined relationship between these two information types. The confidential data does not pass to the outside of the integrated circuit.

The security chip may itself have a microprocessor and memories and among the latter electrically programmable and optionally electrically erasable, non-volatile memories. The operating program of this microprocessor is in principle recorded in a read-only memory of the chip. However, it could also be partly recorded in a non-volatile memory. The content of at least some of the non-volatile memories is not accessible in reading on external terminals of the chip. This content is used exclusively by the micro-processor for its own needs and in particular for performing security programs involving secret codes placed in inaccessible memories. For example, integrated circuit ST16612 sold by SGS-THOMSON, in which is incorporated the GEMPLUS MCOS non-volatile memory program may prove suitable.

Figure 4:
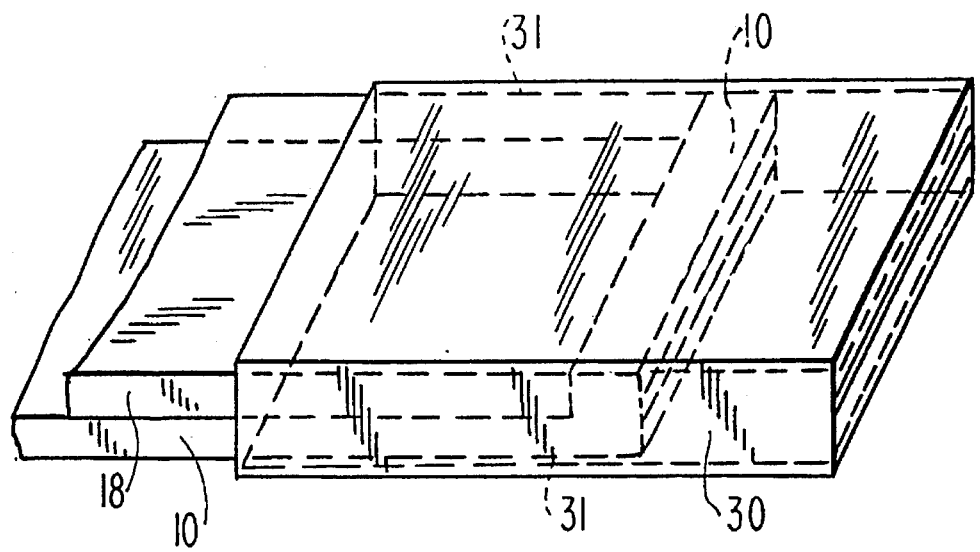
FIG. 4 is a partial perspective view of the two cards in a card reader.

FIG. 4 shows memory card 10, and chip card 18, plugged into a receptacle 30, which has lateral sides 31. The lateral sides 31 guide the memory card 10 and the chip card 18 in. In other words, the receptacle 30 has lateral sides 31, which guide at the same time the memory card 10 and the chip card 18. The receptacle is typically a slot in a reader, and the receptacle has a height of approximately 5 mm.

Figure 5:
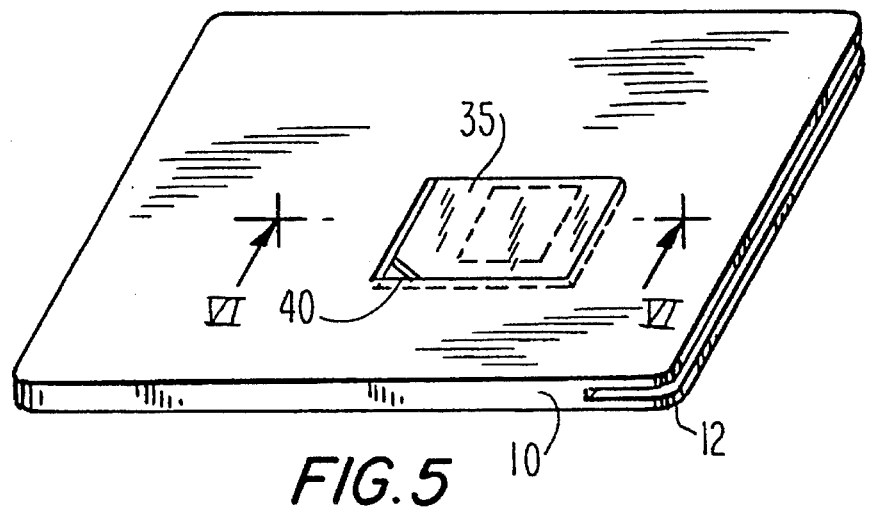
FIG. 5 A general perspective view of another embodiment of a plug-in card and a security card.
Figure 6:
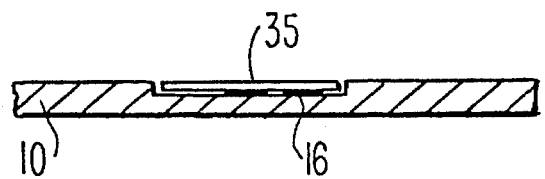
FIG. 6 A partial sectional view taken through VI—VI of FIG. 5.

In another example as shown in FIGS. 5 and 6 the credit card 35 has a smaller size, e.g. has the so-called plug-in format defined for use in European cellular telephony (G.S.M. standard). In this case, the memory card or at least its support 10, only has a single cavity 40 of appropriate size, preferably located where there is no memory chip. This cavity only has an upper opening and does not issue to the rear of the memory card. This cavity 40 is provided in its bottom with a connector 16 for contacting metal coatings 36 of the plug-in card 35 placed there. Another advantage of this solution is that its integration makes it more sturdy, particularly because the card does not project. Thus, it is not possible to tear away the plug-in chip card without tearing away the actual memory card. This avoids any violation, application stopping immediately that it is removed. In addition, spying on the contacts of the chip card becomes virtually impossible.

I claim:

1. A plug-in memory card for a microcomputer, said card having several integrated circuit chips and a connector with several dozen plug-in contacts at an end of the card, said card also comprising a supplementary connector with a plurality of flush contacts on a first surface of the card, said supplementary connector being able to come into contact with a flat chip card, whose access contacts are flush on a face which is facing said first face further comprising card from a computer, into which it is plugged, as a function of the results of the communication.

2. A memory card according to claim 1 wherein said plug-in card with said flat chip card have together external mechanical and electrical connections of a PCMCIA card and fit into a PCMCIA reader.

3. A computer memory and access card system comprising a memory card and a separate access card, both adopted to be inserted into a card reader; said access card having circuitry to verify access to the cards, and a first set of electrical contacts; said memory card having memory, a first set of contacts located to make electrical contact with said first set of contacts of the access card when both cards are positioned in a card reader, and a second set of contacts to make contact with said card reader, whereby communication between said reader and said memory card memory and said access card, is conducted through said second set of contacts.

4. A system according to claim 3 wherein said memory card with said access card have together external mechanical and electrical connections of a PCMCIA card and fit into a PCMCIA reader.

5. A computer memory and access card system comprising a memory card and a separate access card, both adopted to be inserted into a computer card reader; said access card having circuitry to verify access realized from the computer to the memory card, and a first set of electrical contacts; said memory card having memory, a first set of contacts located to make electrical contact with said first set of contacts of the access card when both cards are positioned in said computer's card reader, and a second set of contacts to make contact with said card reader, whereby communication between said reader and said memory card memory and said access card, is conducted through said second set of contacts.

6. a system according to claim 5, wherein said memory card is a plug-in card, and wherein said access card is a flat chip card.

7. A system according to claim 6 wherein said plug-in card with said flat chip card have together external mechanical and electrical connections of a PCMCIA card and fit into a PCMCIA reader.

* * * * *

UNITED STATES PATENT AND TRADEMARK OFFICE
CERTIFICATE OF CORRECTION

PATENT NO. : 5,486,687
DATED : Jan. 23, 1996
INVENTOR(S) : Jean-Yves Le Roux

It is certified that error appears in the above-indentified patent and that said Letters Patent is hereby corrected as shown below:

Column 6, line 26, after "comprising" add -- electronic means for communicating with a flush contact security card placed in contact with the supplementary connector, and means for protecting access to the plug-in --

Signed and Sealed this

Twenty-fifth Day of November, 1997

Attest:

BRUCE LEHMAN

Attesting Officer

Commissioner of Patents and Trademarks